United States Patent [19]

Knapp

[11] Patent Number: 5,088,688
[45] Date of Patent: Feb. 18, 1992

[54] FIXED PLATE FOR A HYDRAULIC VALVE, PROVIDED WITH MEANS FOR EJECTING CHIPS

[75] Inventor: Francesco Knapp, Pavia, Italy

[73] Assignee: Studio Tecnico Sviluppo e Ricerche S.T.S.R. s.r.l., Lacchiarella, Italy

[21] Appl. No.: 648,368

[22] Filed: Jan. 31, 1991

[30] Foreign Application Priority Data

Feb. 13, 1990 [IT] Italy .................. 67103 A/90

[51] Int. Cl.⁵ .................................................. F16K 3/00
[52] U.S. Cl. .................................. 251/304; 137/454.5
[58] Field of Search ........................... 251/208, 304; 137/454.5, 625.31

[56] References Cited

U.S. PATENT DOCUMENTS

| | | | |
|---|---|---|---|
| 3,788,601 | 1/1974 | Schmitt | 251/304 |
| 4,186,773 | 2/1980 | Flynn | 251/304 X |
| 4,325,403 | 4/1982 | Uhlmann | 137/454.5 X |

OTHER PUBLICATIONS

U.S. patent application Ser. No. 07/524,963, filed May 18, 1990, to Grassberger.

*Primary Examiner*—John C. Fox
*Attorney, Agent, or Firm*—Young & Thompson

[57] ABSTRACT

A fixed plate of hard material for a hydraulic valve, of the type, mainly used in the socalled screw type faucets, which has a passage opening asymmetrically located with respect to the center of the plate, and has, on the lapped working face, a surface portion opposite the passage opening with respect to the plate center, which is situated at the same level as the surface portion surrounding the passage opening, and has another surface portion which is recessed; this recessed surface portion is open towards the periphery of the plate. Preferably the recessed portion of the plate working face is limited, with respect to the non recessed portion, by rims which, at least in part, are not concentric with respect to the geometrical center of the plate, and more preferably these rims are directed substantially radially with respect to the geometrical center of the plate.

7 Claims, 2 Drawing Sheets

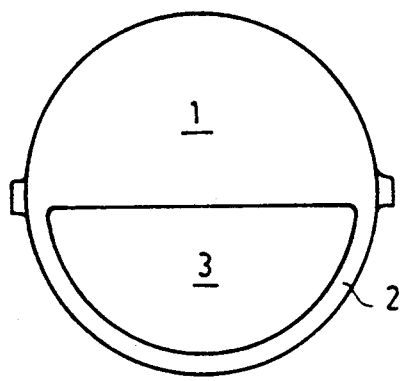
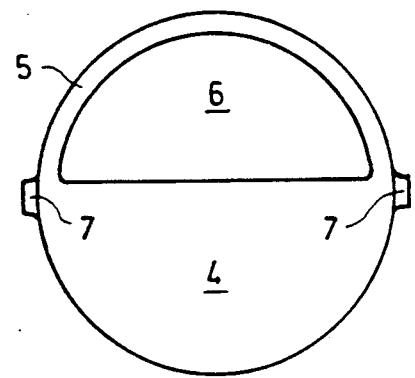
FIG.1
(PRIOR ART)
FIG.2
(PRIOR ART)
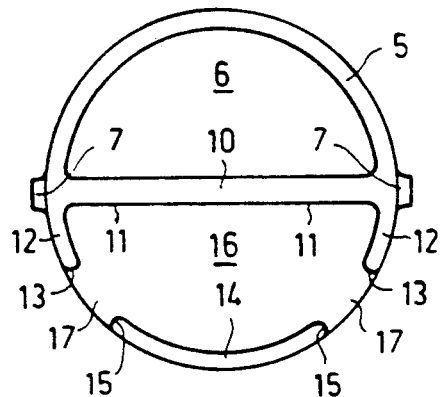
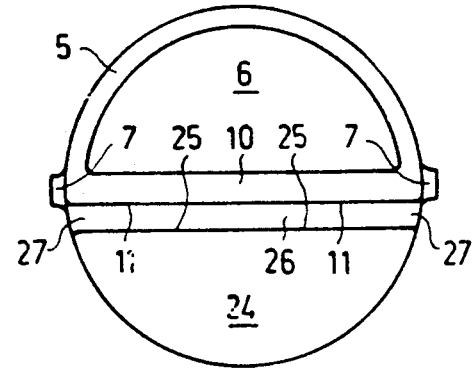
FIG.3
FIG.4
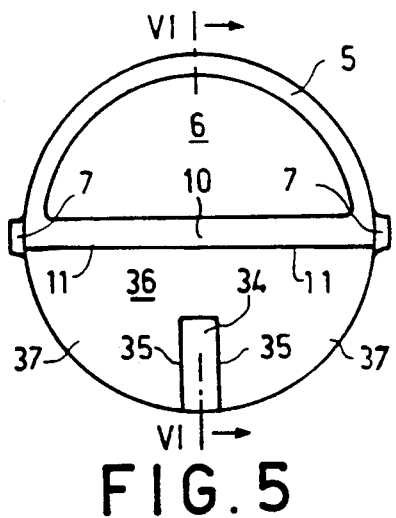
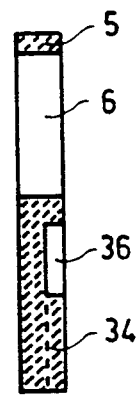
FIG.5
FIG.6

FIXED PLATE FOR A HYDRAULIC VALVE, PROVIDED WITH MEANS FOR EJECTING CHIPS

BACKGROUND OF THE INVENTION

The subject of this invention is a fixed plate of hard material for a hydraulic valve, of the type, mainly used in the socalled screw type faucets, which has a passage opening asymmetrically located with respect to the plate center.

A fixed plate of the type to which this invention refers is used by forming a pair with a similar movable plate, and this pair of plates is mounted in the valve between an inlet connection and an outlet connection. Each plate is limited, on a working face, by a lapped planar surface, and the lapped surfaces of both plates are in mutual contact and are suitable for effecting a hydraulic sealing. The movable plate is so mounted that it may be turned with respect to the fixed plate by means of a control member, whereby, when both plates have their passage openings in mutual register, the valve allows passage of a maximum flow, when the passage openings of the two plates are in diametrically opposite positions the flow is shut out, and in the intermediate positions the passage of a partial flow is allowed. The control field of such valve is about 180°.

These pairs of plates give rise to a particular problem. Because the passage opening is located in an asymmetrical position, the force applied by the water pressure to the plates is asymmetrical too, and it causes strain concentrations. The hard materials forming the plates are generally rather brittle, and therefore the mutual displacement of the plates under these strain concentrations causes tiny splinterings, from which ensues the formation of little chips of hard material. These chips are confined between the lapped planar surfaces of the two plates forming the pair, from which they have been detached, and cannot easily escape because these surfaces extend on the entire area of the plates, with the only exception of the passage openings. With the lapse of time such chips give rise to grooves in the lapped surfaces, and thus jeopardize the perfect behaviour of the valve.

On the contrary, the described disadvantage does not appear in some plates which are similar to those now considered but have two diametrically opposite passage openings. In this case the forces applied by the water pressure are always symmetric; such symmetric forces do not give rise to strain concentrations, and therefore no splinterings take place and no hard material chip is formed. But the plates showing such a symmetrical disposition of the passage openings have a control field of 90° only, which is too limited for allowing an easy and accurate control of the valve.

SUMMARY OF THE INVENTION

In view of the above, the object of this invention is to improve a fixed plate for a valve, of the type having a passage opening asymmetrically located with respect to the plate center, in such a way as to prevent any damage of the hydraulically sealing lapped surface, deriving from the hard material chips originated by the splinterings of both the surfaces of the fixed plate itself and the movable plate cooperating therewith, and this by allowing the ejection of such chips.

This object is attained, according to the invention, by the fact that a plate of the considered type has, on its lapped working face, a surface portion, opposite the passage opening with respect to the plate center, which is situated at the same level as the surface portion surrounding the passage opening, and has another surface portion, not adjacent said passage opening, which is recessed, this recessed surface portion being open towards the plate periphery.

The described arrangement does not impair the valve sealing, because all the surface portion of the lapped working face of the fixed plate, which surrounds the passage opening, remains at a uniform level and is suitable for correctly cooperating with the lapped working face of the movable plate forming a pair with the fixed plate. Moreover, the portion of the working face of the fixed plate, which is a part of the surface opposite the passage opening with respect to the plate center, and is located at the same level as the surface, portion surrounding the passage opening, ensures a correct rest position of the movable plate cooperating with the fixed plate, and prevents any inclination of the movable plate with respect to the fixed plate, under the action of the asymmetrical strains which are present. But the presence of a recessed portion of the working face of the fixed plate causes a quick ejection, from the lapped surfaces of the mutually cooperating plates, of the chips situated between said lapped surfaces, as a consequence of the relative displacement of the plates at the time of each valve control. Then, said chips can no more enter between the lapped plate surfaces, nor they can accumulate, because the recessed surface portion is open towards the plate periphery, and therefore the chips are taken away by the water flow passing through the valve.

Preferably, said recessed portion of the working plate face is limited, with respect to the unrecessed portion, by rims which, at least in part, are not concentric with respect to the geometrical center of the plate. Thanks to this arrangement, a brushing action is effected on the lapped surface of the movable plate by the rim of the unrecessed surface portion of the fixed plate, at the time of each displacement of the movable plate. This brushing action aims to positively remove the chips which lie on the lapped surface of the movable plate, by causing them to fall into the recessed portion, from which they are then taken away by the water flow.

This brushing action attains the maximum effectiveness when at least a part of the rims which separate the recessed portion of the plate from the unrecessed portion thereof is directed substantially radially with respect to the geometrical center of the plate.

BRIEF DESCRIPTION OF THE DRAWINGS

These and other features and advantages of the subject of this invention will appear more clearly from the following description of some embodiments of the invention, given as non limitative examples and diagrammatically shown in the annexed drawings, wherein:

FIG. 1 shows, in a front view of the working face, a known movable plate of the kind intended to cooperate with a fixed plate of the type considered by the invention;

FIG. 2 shows, in a front view of the working face, a fixed plate of the type to which this invention may be applied, but in its conventional form, not improved by the invention;

FIGS. 3 to 5 show, in a manner similar to FIG. 2, three different embodiments according to which this invention may be applied to a fixed plate;

FIG. 6 shows a cross section, taken along line VI—VI, of the fixed plate shown by FIG. 5.

DETAILED DESCRIPTION OF THE PREFERRED EMBODIMENTS

Figure 7:
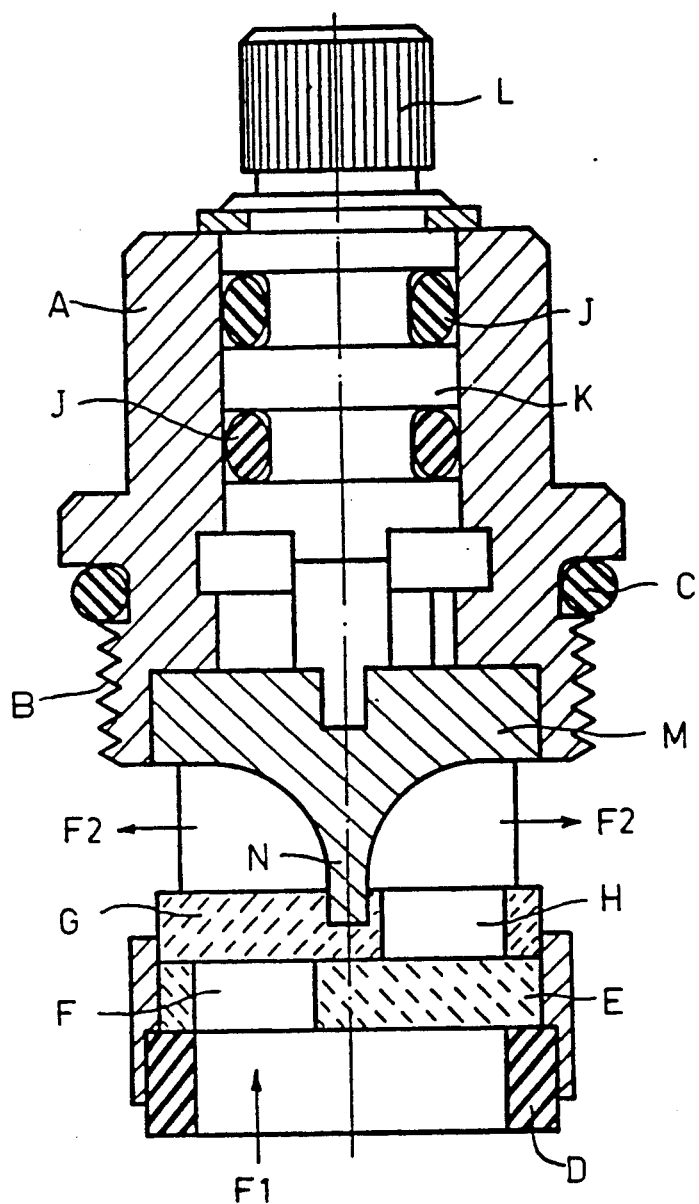
FIG. 7 shows the axial section of a socalled screw type faucet, in which the plates according to FIGS. 1 to 5 may be used.

With reference at first to FIG. 7, a socalled screw faucet, of the kind taken into consideration for the application of this invention, comprises a faucet body A intended to be screwed by means of a threading B into a manifold (not shown) of a valving group, and to seal therein by means of a packing C. The bottom portion of faucet body A is intended to communicate, through a packing D, with an inlet opening for the water flow to be controlled, which enters along arrow F1 and then flows into the manifold through side openings of the faucet body A, along arrows F2. A hard material fixed plate E, having a passage opening F, is housed within body A over packing D so as not to be able to rotate. A movable plate G, having a passage opening H as well, is superimposed to the fixed plate E and rotatably contacts the same. In the position shown, the passage openings F and H of the two plates E and G do not register, and therefore a closure condition is obtained. Within body A there is mounted, sealing by means of packings J, a shaft K, which has at its outer end a toothed coupling L for a control handle (not shown). At its inner end shaft K has a control head M which, by means of a key N, engages the movable plate G and imparts to the same any rotation displacements which may have been imparted by means of the control handle to the shaft K. The hard material plates E and G form the members for the flow control, and form the pair of plates, to the fixed one of which the present invention may be applied.

FIGS. 1 and 2 show the usual conformation of both plates, respectively the one movable and the other fixed, which are intended to form a pair of plates for a hydraulic valve of the considered kind. The movable plate according to FIG. 1 has on its working face a lapped surface 1, which extends over a little more than a half of the plate and forms a peripheral border 2 around a passage opening 3 which, in its turn, extends over little less than a half of the plate. In its turn, a usual fixed plate according to FIG. 2 has on its working face a lapped surface 4, which extends over a little more than a half of the plate and forms a peripheral border 5 around a passage opening 6 which, in its turn, extends over a little less than a half of the plate. Some projections 7 may be provided in order to establish the position of the fixed plate with respect to a supporting member, not shown. In the usual conformations described above, the surfaces 1 and 2 of the movable plate, and the surfaces 4 and 5 of the fixed plate, lie entirely in a single plane. In the application of the invention, no change has to be effected of the movable plate 1-3, which remains unmodified and is suitable for cooperating both with the fixed plates improved by the invention, and with the usual fixed plates.

In the embodiment of the invention according to FIG. 3, the fixed plate still has a passage opening 6 surrounded by a peripheral border 5, and if desired may have positioning projections 7, but the surface 4, which lay in on a single plane in the known plate according to FIG. 2, is now subdivided into a portion comprising the parts 10, 12 and 14, which still lie in the same plane as the surface of the peripheral border 5 surrounding the passage opening 6, and a portion 16 which, on the contrary, is somewhat recessed, and opens towards the periphery of the plate through passages 17.

The unrecessed portion 10 completes, with the unmodified peripheral border 5, the perimeter of the passage opening 6, and therefore it allows the fixed plate to correctly cooperate with the movable plate 1-3 from the hydraulic point of view. The unrecessed portions 12 and 14, in their turn, offer to the cooperating movable plate a support and therefore they allow the fixed plate to correctly cooperate with the movable plate 1-3 even from the mechanical point of view. On the other hand, the recessed portion 16 defines a region wherein there is no contact between the fixed plate and the movable plate, whereby the hard material chips which may have been formed cause no disadvantage when they locate in this region. Besides, such chips cannot remain for a long time or accumulate in region 16, because this latter is open towards the periphery of the plate through passages 17, and therefore the chips are taken away by the water flow which, in the operation of the valve, flows in part through these passages too. Finally it is to be noted that, during the displacements of the movable plate during valve control, the rims 13 and 15, which limit the parts 12 and 14 of the unrecessed surface portion, brush the lapped surface of the movable plate, thus pushing away the chips lying thereon. A similar brushing action is also effected by the rims 11 of part 10 of the unrecessed surface portion.

In the embodiment of the invention according to FIG. 4, the fixed plate still has a passage opening 6 surrounded by a peripheral border 5, and possibly positioning projections 7, but the surface 4, which lay in a single plane in the known plate according to FIG. 2, is now subdivided into a portion comprising the parts 10 and 24, which still lies in the same plane as the surface of the peripheral border 5 surrounding the passage opening 6, and a portion 26 which, on the contrary, is somewhat recessed, is formed in this case by a groove, and opens towards the periphery of the plate through its end portions 27.

The unrecessed portion 10 completes, with the unmodified peripheral border 5, the perimeter of the passage opening 6, and therefore it allows the fixed plate to correctly cooperate with the movable plate 1-3 from the hydraulic point of view. The unrecessed portion 24, in its turn, offers to the cooperating movable plate a rest, and therefore it allows the fixed plate to correctly cooperate with the movable plate 1-3 even from the mechanical point of view. Finally, the groove 26 defines the region wherein the chips which leave the lapped surfaces of the plates may fall, and wherefrom they are then taken away by the water flow through the end portions 27 of groove 26. In this case the rims 11 of the unrecessed surface portion 10, and the rims 25 of the unrecessed surface portion 24, effect the brushing action on the lapped surface of the movable plate.

Finally, in the embodiment of the invention according to FIGS. 5 and 6, the fixed plate still has a passage opening 6 surrounded by a peripheral border 5, and possibly positioning projections 7, but the surface 4, which lay in a single plane in the known plate according to FIG. 2, is now subdivided into a portion comprising the parts 10 and 34, which still lies on the same plane as the surface of the peripheral border 5 surrounding the passage opening 6, and a portion 36 which, on the contrary, is somewhat recessed, extends in this case on about a half of the plate, and widely opens towards the periphery of the plate through its regions 37.

The unrecessed portion 10 completes, with the unmodified peripheral border 5, the perimeter of the passage opening 6, and therefore it allows the fixed plate to correctly cooperate with the movable plate 1-3 from the hydraulic point of view. The unrecessed portion 34, in its turn, offers to the cooperating movable plate a support and therefore it allows the fixed plate to correctly cooperate with the movable plate 1-3 even from the mechanical point of view. The position of portion 34, diametrically opposite the passage opening 6, makes this support action particularly effective although part 34 has a reduced extension. Finally, the recessed portion 36 defines the region wherein the chips which leave the lapped surfaces of the plates may fall, and wherefrom they are then taken away by the water flow through the peripheral regions 37. In this case the rims 11 of the unrecessed surface portion 10, but above all the rims 35 of the unrecessed surface portion 34, effect the brushing action on the lapped surface of the movable plate.

The nearly radial position of the rims 35 gives them a particular effectiveness in this action. In the present embodiment, the great extension of the recessed portion 36 and its ample opening towards the outside in regions 37 at the periphery of the plate make the action of ejecting the chips particularly effective. Another reason for the special effectiveness of the embodiment according to FIGS. 5 and 6 resides in that the part 34 of the unrecessed portion has a reduced circumference and therefore the chips deriving from splinterings arrive quickly at the rims 35 and fall into the recessed part 36, whereby they are ejected before having damaged to a noticeable extent the working surfaces of the plates.

As it may be understood from the above, this invention may be embodied in very different embodiments of manufacture, all suitable for attaining the pre-established object. Therefore the designer disposes of a wide choice of possible embodiments, which in all cases allow applying the invention in the more convenient way. Of course, also other embodiments are possible in addition to those shown, and different modifications, as well as any replacement by technically equivalent means, may be introduced.

I claim:

1. In a fixed plate of a hard material for a hydraulic valve, having a plate center, a plate periphery and a lapped working face, and comprising a passage opening asymmetrically located with respect to said plate center, a portion of said lapped working face which surrounds said passage opening and a portion of said lapped working face, opposite said passage opening with respect to said plate center, which is situated at the same level as said portion surrounding the passage opening, the improvement that the fixed plate has a surface portion, spaced from said passage opening, which is recessed with respect to said lapped working face, all of this recessed surface portion being open towards said plate periphery and said fixed plate having no recessed surface portion which is not entirely open towards said plate periphery.

2. A fixed plate for a valve, as set forth in claim 1, comprising rims which limit said recessed surface portion of the working plate face with respect to the unrecessed portions of the lapped working face, said rims being, at least in part, not concentric with respect to said plate center, and being suitable for effecting a brushing action.

3. A fixed plate for a valve, as set forth in claim 2, wherein at least a part of said rims which limit the recessed portion of the plate with respect to the not recessed portions is directed substantially radially with respect to said center of the plate.

4. A fixed plate for a valve, as set forth in claim 1, wherein the unrecessed portions of the plate comprise a substantially diametrical portion and interrupted portions extending along the periphery of the plate.

5. A fixed plate for a valve, as set forth in claim 1, wherein said recessed portion of the plate has the shape of a groove which is nearly diametrical with respect to the plate.

6. A fixed plate for a valve, as set forth in claim 1, wherein the unrecessed portions of the plate comprise a substantially diametrical part and a part which is diametrically opposite said passage opening and has side rims which are substantially radial with respect to said center of the plate.

7. A fixed plate for a valve, as set forth in claim 1, wherein the unrecessed portion of the plate has a very limited circumferential extension.

* * * * *